US005189340A

United States Patent [19]

Ikeda

[11] Patent Number: 5,189,340

[45] Date of Patent: Feb. 23, 1993

[54] FLUORESCENT LAMP ASSEBMLY FOR IMAGE SCANNER

[75] Inventor: Shinyu Ikeda, Tokyo, Japan

[73] Assignee: Asahi Kogaku Kogyo Kabushiki Kaisha, Tokyo, Japan

[21] Appl. No.: 888,460

[22] Filed: May 19, 1992

Related U.S. Application Data

[63] Continuation of Ser. No. 213,767, Jun. 30, 1988, abandoned.

[30] Foreign Application Priority Data

Jul. 3, 1987 [JP] Japan ............................... 62-166572

[51] Int. Cl.[5] ...................... H05B 37/00; G03B 15/00

[52] U.S. Cl. .................................... 315/116; 315/117; 313/13; 313/44; 355/229

[58] Field of Search ................ 315/116, 115, 50, 117, 315/112; 313/13, 15, 34, 44, 488, 113; 307/117; 361/103; 355/69, 229, 228, 67, 69; 358/475

[56] References Cited

U.S. PATENT DOCUMENTS

| | | | |
|---|---|---|---|
| 2,491,881 | 12/1949 | Liempt | 315/116 |
| 2,581,959 | 1/1952 | Koehler | 315/116 |
| 3,432,232 | 3/1969 | Tompkins | 355/229 |
| 3,779,640 | 12/1973 | Kidd | 355/229 |
| 4,140,385 | 2/1979 | Shaw et al. | 313/15 |

FOREIGN PATENT DOCUMENTS

| | | | |
|---|---|---|---|
| 5814165 | 1/1983 | Japan | 355/229 |

*Primary Examiner*—Robert J. Pascal

*Attorney, Agent, or Firm*—Sandler Greenblum & Bernstein

[57] ABSTRACT

In a fluorescent lamp assembly for use in an image scanner, a heater is associated with a glass tube of a fluorescent lamp for heating the glass tube. A controller is provided for controlling the heater in such a manner as to maintain temperture of the glass tube at the predetermined optimum level at which a luminescent characteristic of the fluorescent lamp is stabilized.

18 Claims, 3 Drawing Sheets

FLUORESCENT LAMP ASSEBMLY FOR IMAGE SCANNER

This application is a continuation of application Ser. No. 07/213,767, filed Jun. 30, 1988, now abandoned.

BACKGROUND OF THE INVENTION

This invention relates to a fluorescent lamp assembly for use in an image scanner which reads out an image as an electric signal.

Conventionally, an image scanner is known, which scans an original to convert an image thereon to an electric signal. The image scanner comprises a scanning head having a line sensor in which a plurality of picture elements are arranged in a single row. In use, the image scanner or the original moves in one direction to cause the scanning head to carry out a main scanning of the original. The image scanner or the original also moves perpendicular to the main scanning direction to cause the scanning head to carry out an auxiliary scanning of the original. The image scanner converts the light quantity incident upon an image sensor to an electric signal corresponding to the incident light quantity, thereby reading out the image on the original.

The scanning head is composed of a light source, an objective lens, a mirror and the sensor, all of which extend over the entire length of the scanning head in the main scanning direction. The main scanning by the image sensor is such that a portion of the original illuminated with light from the light source is imaged onto the light receiving surface of the image sensor by the objective lens.

A fluorescent lamp which is generally a discharge lamp, is employed as the light source of the scanning head described above.

The fluorescent lamp has its luminescent characteristic such that it has a luminous intensity distribution in the longitudinal direction and an absolute value of a light quantity. As shown in FIG. 4, the luminous characteristic largely varies during a period from the initial stage of light emission after having been turned on, to a stable stage. After a certain time (of the order of 30 seconds, for example) has elapsed after having been turned on, heat generation due to the light emission raises the temperature of the glass tube of the fluorescent lamp to a certain degree, and the luminous characteristic is stabilized.

In the image scanner, the fluorescent lamp emits light simultaneously with the start-up of scanning by the image scanner, and is turned off after having carried out the main and auxiliary scannings. Thus, the image scanner always effects scanning just at the unstable stage of the luminescent characteristic. As a result, an accurate read-out signal cannot be obtained.

In the meantime, the luminous intensity of the fluorescent lamp varies depending upon the longitudinal position on the lamp, even during the stable light emission period. If the luminous intensity distribution is stable, however, it is possible to correct the readout signal. It has been impossible, however, to correct the instability of the luminescent characteristic as mentioned above.

SUMMARY OF THE INVENTION

It is therefore an object of this invention to provide an improved fluorescent lamp assembly for use in an image scanner, capable of obtaining a luminescent characteristic which is always stable.

For the above purpose, according to the invention, there is provided a fluorescent lamp assembly for use in an image scanner, which comprises;

a fluorescent lamp having a glass tube;

means for energizing the fluorescent lamp;

heating means for heating the glass tube of the fluorescent lamp independently of the energization of the fluorescent lamp; and control means for controlling the heating means in such a manner as to maintain temperature of the glass tube at a predetermined optimum level at which a luminescent characteristic of the fluorescent lamp is stabilized.

BRIEF DESCRIPTION OF THE ACCOMPANYING DRAWINGS

DESCRIPTION OF THE EMBODIMENT

Figure 1:
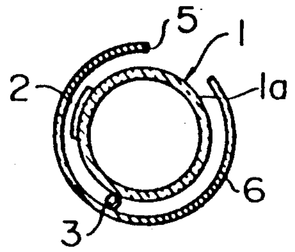
FIG. 1 is a cross-sectional view of a fluorescent lamp assembly embodying the invention, the cross-sectional view being taken along line I—I in FIG. 2.
Figure 2:
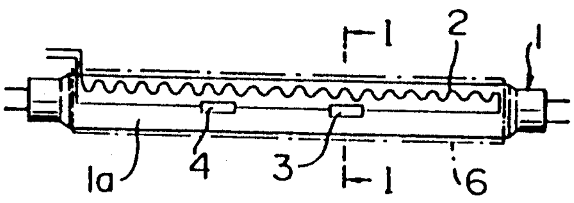
FIG. 2 is a front elevational view of the lamp assembly illustrated in FIG. 1.
Figure 3:
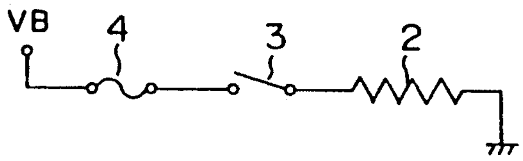
FIG. 3 is a circuit diagram of a heater circuit incorporated in the lamp assembly illustrated in FIGS. 1 and 2.
Figure 4:
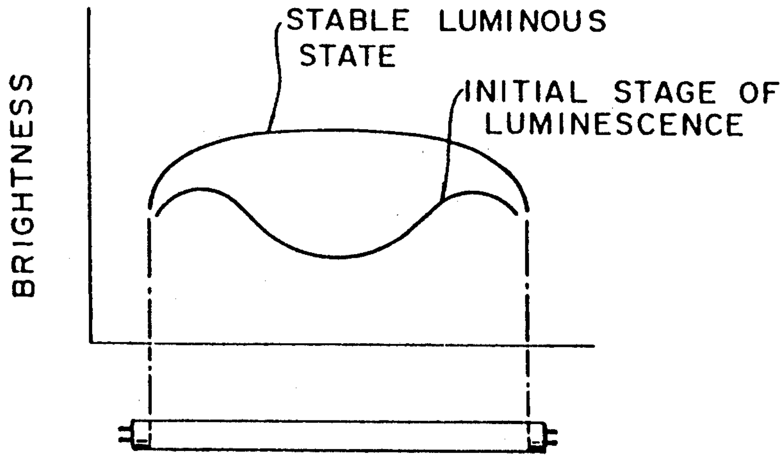
FIG. 4 is a graphical representation of a luminescent characteristic of a fluorescent lamp illustrated in FIGS. 1 and 2.

Referring to FIGS. 1 through 3, there is shown a fluorescent lamp assembly for use in an image scanner, embodying the invention. The lamp assembly comprises a fluorescent lamp 1 having an elongated glass tube 1*a*, and a heater circuit associated with the fluorescent lamp 1. The heater circuit is composed of a heater 2, a temperature switch 3, a temperature-sensitive fuse 4, and an electric power source VB.

The fluorescent lamp 1 serves as a light source which is arranged, together with an objective lens, a CCD (charge coupled device) image sensor and the like, within a scanning head of the image scanner, in predetermined positional relation to the objective lens, the CCD image sensor and the like. The fluorescent lamp 1 is fixedly supported by the scanning head in such a manner that a longitudinal axis of the lamp 1 is in coincident with the main scanning direction.

The fluorescent lamp 1 emits light only from a longitudinally extending portion of the periphery of the glass tube 1*a*, to illuminate a portion of the original, which is to be read out by the CCD image sensor. Accordingly, the glass tube 1*a* is substantially surrounded by an aluminum foil 6, leaving a longitudinal slit 5 having a predetermined circumferential width.

The heater 2 of the heater circuit comprises at least one electric heating wire such as, for example, a nichrome wire or the like extending longitudinally of the glass tube 1*a*. The heating wire is arranged between the glass tube 1*a* and the aluminum foil 6 and is adhesively bonded to the outer peripheral surface of the glass tube 1*a*.

The temperature switch 3 is electrically connected in series to the heater 2. The temperature switch 3 serves as control means for controlling the heater 2 in such a manner as to maintain temperature of the glass tube 1*a* at a predetermined optimum level. The temperature switch 3 is arranged between the glass tube 1*a* and the aluminum foil 6 and is adhesively bonded fixedly to the outer peripheral surface of the glass tube 1*a*.

The temperature switch 3 utilizes a temperature measuring element such as, for example, a thermistor, platinum or the like which is variable in resistance depending upon temperature. Alternatively, the temperature measuring element may be a thermo couple or the like which produces an electromotive force. Such temperature measuring element is fixedly adhesively bonded to the outer peripheral surface of the glass tube 1*a*, for detecting the temperature of the wall of the glass tube 1*a*. The temperature switch 3 is shiftable between "ON" and "OFF" states. Specifically, the temperature switch 3 moves to its "ON" state when the temperature of the glass tube 1*a* is lower than the predetermined optimum level, while the temperature switch 3 moves to its "OFF" state when the temperature of the glass tube 1*a* exceeds the predetermined optimum level.

Further, the temperature-sensitive fuse 4 is electrically connected in series to the heater 2 and the temperature switch 3. The fuse 4 is fixedly adhesively bonded to the outer peripheral surface of the glass tube 1*a*, like the heater 2 and the temperature switch 3.

The fuse 4 is capable of being melted to open the heater circuit when the temperature of the glass tube 1*a* exceeds a predetermined abnormal level. Since, usually, the temperature switch 3 controls the temperature of the glass tube 1*a*, the fuse 4 is prevented from melting. If an abnormality occurs, such as a malfunction of the temperature switch 3 so that the temperature of the glass tube 1*a* exceeds the predetermined abnormal level, the fuse 4 is melted to open the heater circuit.

The electric power source VB is connected, through a main switch of the image scanner, to the heater circuit comprising the heater 2, the temperature switch and the temperature-sensitive fuse 4 which are connected in series.

Figure 5:
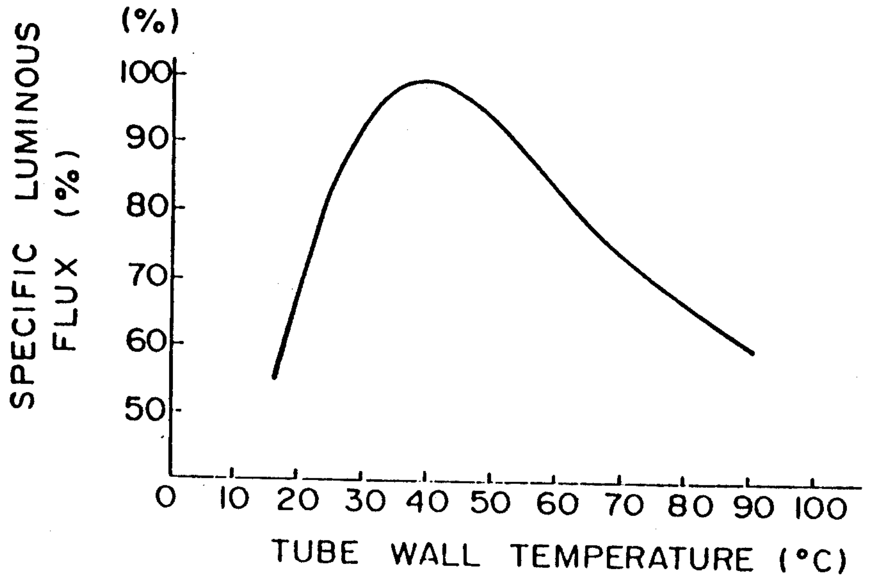
FIG. 5 is a graphical representation of the relationship between the tube wall temperature and the light quantity of the fluorescent lamp.
Figure 6:
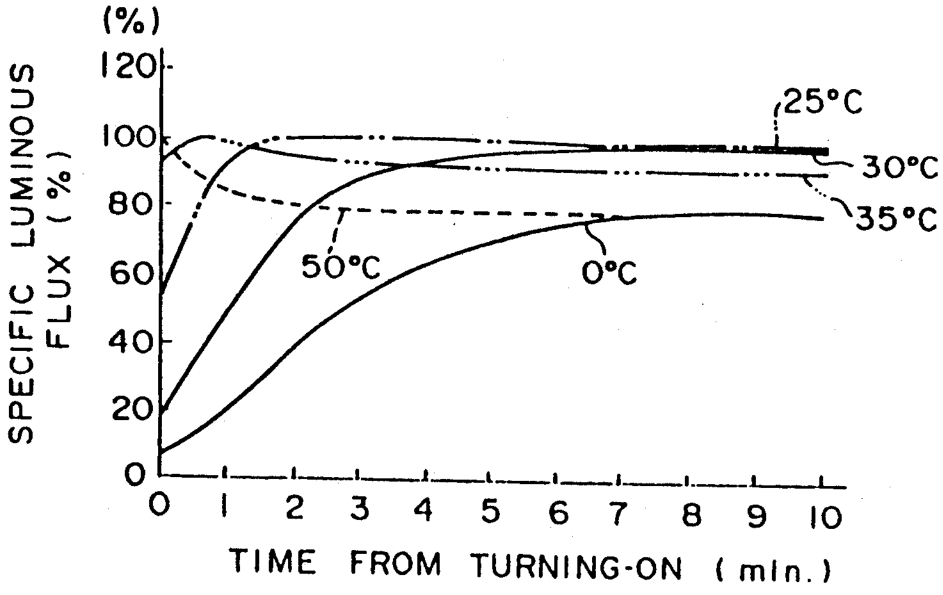
FIG. 6 is a graphical representation of light-emission rising characteristics of the fluorescent lamp when turned on, with respect to the surrounding temperature.

Attention is directed to the fact that, in the fluorescent lamp assembly constructed above, as shown in FIGS. 5 and 6, the luminescent characteristic of the fluorescent lamp 1 depends upon temperature. In view of this fact, the glass tube 1*a* of the fluorescent lamp 1 is heated by the heater 2 to an optimum temperature level that is the aforesaid predetermined optimum temperature level at which the luminescent characteristic of the lamp 1 is stabilized.

FIG. 5 shows the relationship between the wall temperature of the glass tube 1*a* and the light quantity of the fluorescent lamp 1. The relationship reveals that the light quantity is maximum when the tube wall temperature is approximately 40 degrees centigrade. In FIGS. 5 and 6, what is the specific luminous flux represented by the ordinate indicates the light quantity in terms of a percentage on the assumption that the maximum light quantity is 100%.

FIG. 6 shows an example of light-emission rising characteristics of the fluorescent lamp 1 when turned on, with respect to the surrounding temperature. The light-emission rising characteristic reveal that the fluorescent lamp 1 is turned on with the stable luminescent characteristic, from the initial stage of light emission, when the surrounding temperature is approximately 35 degrees centigrade.

Accordingly, in the illustrated embodiment, the glass tube 1*a* of the fluorescent lamp 1 should be heated such that the glass tube 1*a* is brought to an optimum wall temperature level within a range of from approximately 35 to 45 degrees centigrade.

In consideration of a difference between efficiencies of heat conduction of the glass tube 1*a* and the aluminum foil 6, a correction amount is added to the above optimum wall temperature level, to set an operating temperature level for the temperature switch 3. For example, if a level of 45 degrees centigrade is regarded as the optimum wall temperature level, the operating temperature level for the temperature switch 3 should be set to 65 degrees centigrade. In other words, due to the difference of efficience of heat conduction, when the temperature switch 3 detects 65 degrees centigrade, it means that the temperature of the aluminum foil 6 is 65 degrees centigrade while that of the glass tube 1*a* is approximately 45 degrees centigrade.

On the other hand, the temperature at which the temperature-sensitive fuse 4 melts, is set to a predetermined fail-safe level which is higher than the operating temperature level for the temperature switch 3.

As the main switch of the image scanner is turned on, electric current is passed from the source VB to the heater 2 through the temperature sensitive fuse 4 and the temperature switch 3, so that the heating wire of the heater 2 generates heat. The glass tube 1*a* of the fluorescent lamp 1 is heated by the heater 2, whereby the wall temperature of the glass tube 1*a* is raised. As the wall temperature of the glass tube 1*a* is raised to a level corresponding to the operating temperature level for the temperature switch 3, that is, to the predetermined optimum level at which the light emission of the fluorescent lamp 1 is stabilized, the temperature switch 3 is moved to its "OFF" state to open the heater circuit, thereby interrupting the current to the heater 2.

As the glass tube 1*a* is heated to the predetermined optimum temperature level by the heater 2 in the manner described above, an LED (light emitting diode) or the like mounted to the image scanner is turned on to indicate that the fluorescent lamp 1 is ready for operation. Once the LED is turned on, a switch for the fluorescent lamp 1 is turned on to permit current to be supplied to the fluorescent lamp 1 to cause it to emit light. Since the glass tube 1*a* has already been heated to the predetermined optimum temperature level, the fluorescent lamp 1 can have its stable luminescent characteristic, from the beginning of light emission. Accordingly, it is possible to obtain the luminescent characteristic which is substantially uniform from the initial stage of scanning of the original by the image scanner, to the completion of scanning. Thus, reading-out of the original can be carried out in a highly accurate manner.

As the supply of current to the fluorescent lamp 1 is started so that the fluorescent lamp 1 emits light, the wall temperature of the glass tube 1*a* is raised by heat generation due to the light emission Therefore, as the fluorescent lamp 1 is brought to a state in which the glass tube 1*a* is maintained at temperature equal to or higher than the temperature level stabilizing the luminescent characteristic, by the self-heat-generation from the beginning of light emission, the temperature switch 3 is kept open.

On the other hand, when the switch for the fluorescent lamp 1 is in the OFF position, but when the main switch of the image scanner is turned on, the temperature switch 3 detects the wall temperature of the glass tube 1a for controlling energization and deenergization of the heater 2. Thus, the glass tube 1a is maintained at the predetermined optimum wall temperature level stabilizing the luminescent characteristic or the luminous intensity characteristic of the fluorescent lamp 1.

The term independent used herein means that, the heating means is capable of heating the glass tube of the fluorescent lamp both when the fluorescent lamp is energized and when the fluorescent lamp is not energized.

If it becomes impossible to control energization and deenergization of the heater 2 due to a malfunction of the temperature switch 3 so that the wall temperature of the glass tube 1 is raised abnormally, the temperature-sensitive fuse 4 is melted to interrupt supply of current to the heater 2.

As described above, the arrangement of the fluorescent lamp assembly for use in the image scanner, according to the invention is such that the glass tube of the fluorescent lamp is heated by the heater, and the heater is controlled by control means or a temperature switch in such a manner as to maintain the temperature of the glass tube at the predetermined optimum level for stabilizing the luminescent characteristic of the fluorescent lamp. With such arrangement, it is unnecessary to wait for stabilization of the luminescent characteristic of the fluorescent lamp, to start reading-out by the image scanner. Reading-out by the image scanner can be started at once. Further, the luminescent characteristic or luminous intensity characteristic of the fluorescent lamp can be stabilized from the beginning of light emission thereof. Thus, it is possible to improve the accuracy in reading-out of the original at the initial stage of scanning of the original by the image scanner.

What is claimed is:

1. A fluorescent lamp for use in an image scanner comprising:

- a fluorescent lamp having a glass tube;
- means for energizing said fluorescent lamp;
- heating means for heating said glass tube of said fluorescent lamp independently of whether said fluorescent lamp is energized or not; and
- control means for controlling the temperature of said glass tube, said control means comprising means for controlling said heating means independently of said energization means in such a manner as to maintain the temperature of said glass tube at a predetermined optimum level even though said fluorescent lamp is not energized, whereby the luminescent characteristic of said fluorescent lamp is stabilized when said fluorescent lamp is energized.

2. The fluorescent lamp assembly according to claim 1, wherein said heating means comprises electric heating means which, when energized, heats said glass tube of said fluorescent lamp, and wherein said control means includes detecting means for detecting the temperature of said glass tube to be shifted between "ON" and "OFF" states respectively when the temperature of said glass tube is lower than and exceeds said predetermined optimum level, said electric heating means being energized and deenergized in response respectively to said "ON" and "OFF" states of said detecting means.

3. The fluorescent lamp assembly according to claim 2, wherein said electric heating means is composed of at least one heating wire, said heating wire extending longitudinally of said glass tube of said fluorescent lamp and being arranged in contact with an outer peripheral surface of said glass tube.

4. The fluorescent lamp assembly according to claim 2, wherein said control means comprises a temperature switch electrically connected in series to said electric heating means, said temperature switch being shiftable between "ON" and "OFF" states, depending upon the temperature of said glass tube of said fluorescent lamp.

5. The fluorescent lamp assembly according to claim 4, wherein said temperature switch is arranged in contact with an outer peripheral surface of said glass tube of said fluorescent lamp.

6. The fluorescent lamp assembly according to claim 4, further comprising temperature-responsive fuse means electrically connected in series to said temperature switch, said fuse means, said temperature switch and said electric heating means forming a heater circuit, said fuse means being capable of being melted to open said heater circuit when temperature of said glass tube of said fluorescent lamp exceeds a predetermined abnormal level.

7. The fluorescent lamp assembly according to claim 6, wherein said fuse means is arranged in contact with an outer peripheral surface of said glass tube of said fluorescent lamp.

8. The fluorescent lamp assembly according to claim 4, further comprising an aluminum foil substantially surrounding an outer peripheral surface of said glass tube of said fluorescent lamp, leaving a longitudinal slit extending in parallel relation to an axis of said glass tube.

9. The fluorescent lamp assembly according to claim 8, wherein said electric heating means is composed of at least one heating wire extending longitudinally of said glass tube of said fluorescent lamp, said heating wire being arranged between said glass tube and said aluminum foil and in contact with the outer peripheral surface of said glass tube, and wherein said temperature switch is arranged between said glass tube and said aluminum foil and in contact with the outer peripheral surface of said glass tube.

10. A fluorescent lamp assembly according to claim 1, which further comprises a power source which supplies power to said heating means, independently of the energization of said fluorescent lamp.

11. The fluorescent lamp according to claim 1, wherein said control means for controlling said heating means comprises means for heating said glass tube both when said lamp is energized and when said lamp is not energized.

12. The fluorescent lamp according to claim 1, wherein said control means consists of means for controlling said heating means independently of said energization means in such a manner as to maintain the temperature of said glass tube at a predetermined optimum level even though said fluorescent lamp is not energized, whereby the luminescent characteristic of said fluorescent lamp is stabilized when said fluorescent lamp is energized.

13. The fluorescent lamp for use in an image scanner, which comprises:

- a fluorescent lamp;
- means for energizing said fluorescent lamp;
- means for heating said fluorescent lamp; and
- means for controlling the temperature of said fluorescent lamp, said control means comprising means for controlling said heating means independently of said energization means to maintain the temperature of said fluorescent lamp so that the luminescent characteristic of said fluorescent lamp is stabilized.

14. The fluorescent lamp according to claim 11, said means for controlling said heating means comprising means for heating said glass tube both when said lamp is energized and when said lamp is not energized.

15. The fluorescent lamp according to claim 13, wherein said control means consists of means for controlling said heating means independently of said energization means in such a manner as to maintain the temperature of said glass tube at a predetermined optimum level even though said fluorescent lamp is not energized, whereby the luminescent characteristic of said fluorescent lamp is stabilized when said fluorescent lamp is energized.

16. A fluorescent lamp for use in an image scanner, comprising:

a fluorescent lamp having a glass tube, said fluorescent lamp being capable of being energized;

heating means for heating said glass tube of said fluorescent lamp independently of whether said fluorescent lamp is energized or not; said heating means comprising at least one heating wire extending longitudinally of said glass tube and being arranged between said glass tube and an aluminum foil, said aluminum foil substantially surrounding an outer peripheral surface of said glass tube of said fluorescent lamp, leaving a longitudinal slit extending in parallel relation to an axis of said glass tube; and control means for controlling said heating means in such a manner as to maintain the temperature of said glass tube at a predetermined optimum level even though said fluorescent lamp is not energized, whereby the luminescent characteristic of said fluorescent lamp is stabilized when said fluorescent lamp is energized; said control means comprising a temperature switch electrically connected in series to said heating means and being shiftable between "ON" and "OFF" states, depending on the temperature of said glass tube of said fluorescent lamp.

17. The fluorescent lamp according to claim 16, further comprising:

means for energizing said fluorescent lamp, wherein said control means controls said heating means independently of said energization means.

18. The fluorescent lamp according to claim 16, wherein said control means for controlling said heating means comprises means for heating said glass tube both when said lamp is energized and when said lamp is not energized.

* * * * *

UNITED STATES PATENT AND TRADEMARK OFFICE

CERTIFICATE OF CORRECTION

PATENT NO. : 5,189,340

DATED : February 23, 1993

INVENTOR(S) : S. IKEDA

It is certified that error appears in the above-indentified patent and that said Letters Patent is hereby corrected as shown below:

On the title page, item [54] , line 1, change "ASSEBMLY" to ---ASSEMBLY---.

At column 6, line 61 (claim 13, line 1), change "The" to ---A---.

Signed and Sealed this

Twenty-third Day of August, 1994

Attest:

BRUCE LEHMAN

*Attesting Officer* *Commissioner of Patents and Trademarks*